April 24, 1956 — S. C. BARTLEY — 2,743,388
ELECTRIC LAMP
Filed Sept. 8, 1953 — 4 Sheets-Sheet 1
Fig. 1.
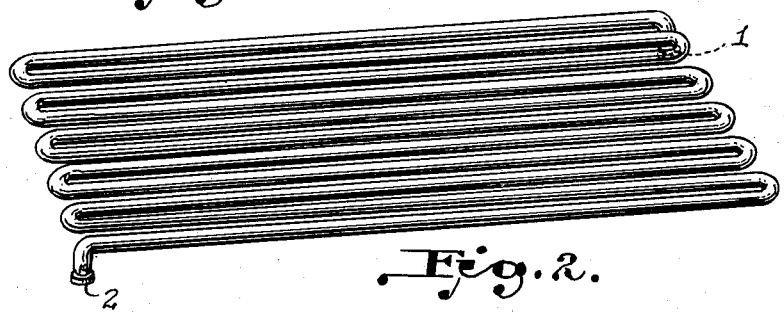
Fig. 2.
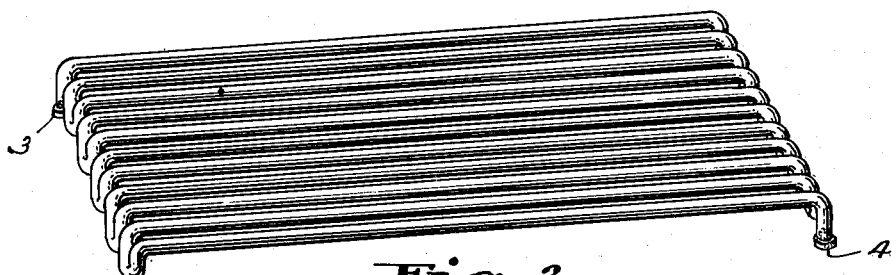
Fig. 3.
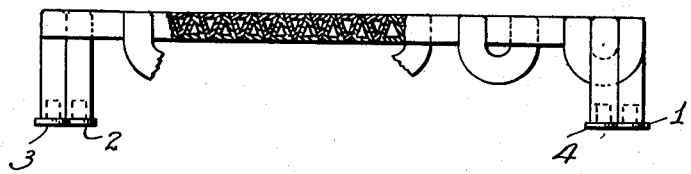
Fig. 4.
Fig. 5.
Fig. 6.
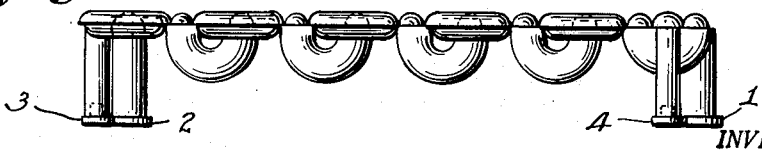
Fig. 7.
INVENTOR:
SAMUEL C. BARTLEY
BY Holcombe Wetherell & Brisebois
HIS ATTY'S.

Fig. 8.
Fig. 13.
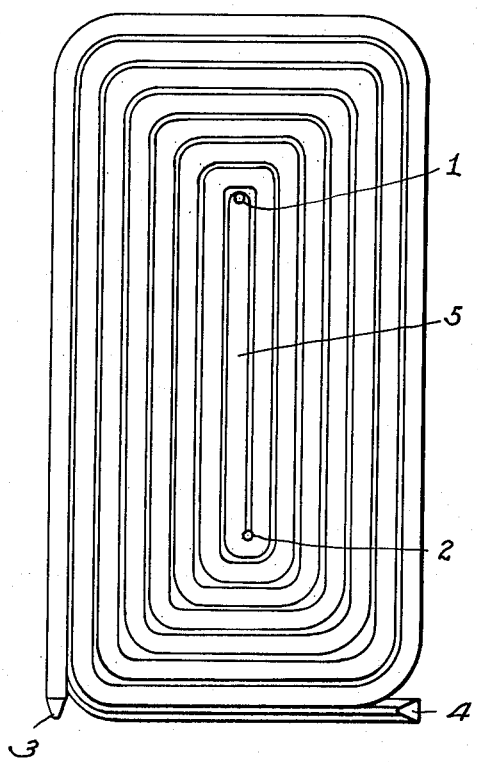
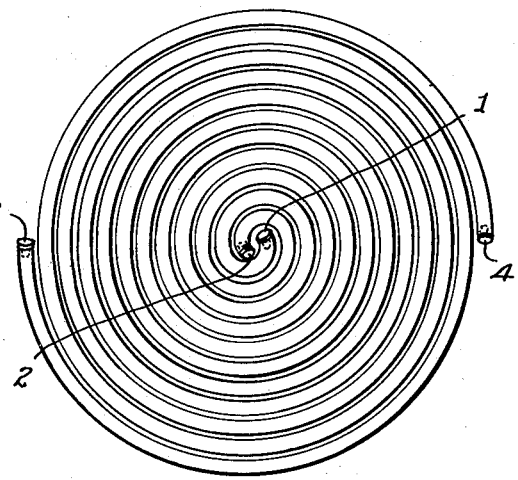
Fig. 11.
Fig. 12.
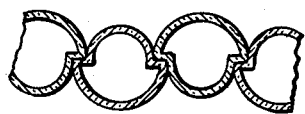
Fig. 9.
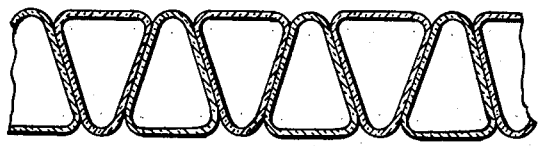
Fig. 10.
INVENTOR.
SAMUEL C. BARTLEY
BY
HIS ATTYS.

April 24, 1956  S. C. BARTLEY  2,743,388
ELECTRIC LAMP
Filed Sept. 8, 1953  4 Sheets-Sheet 3
Fig. 14.
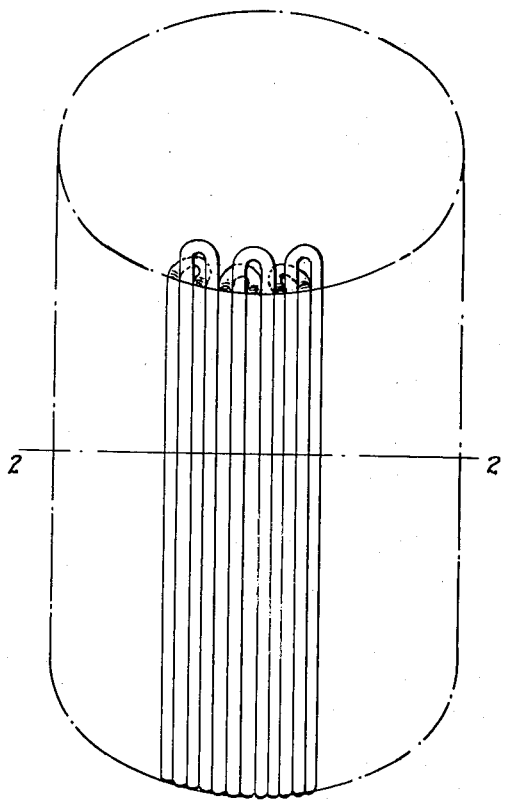
Fig. 19.
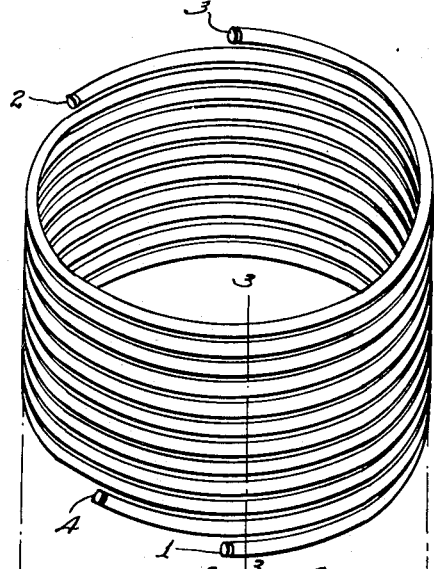
Fig. 16.
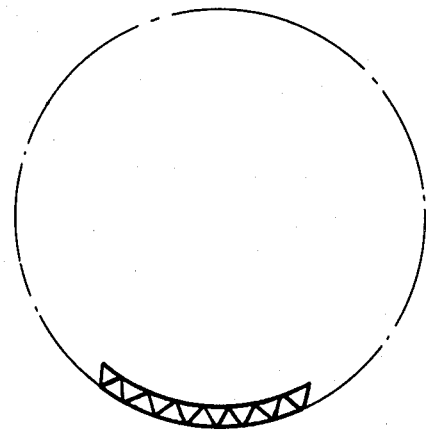
Fig. 15.
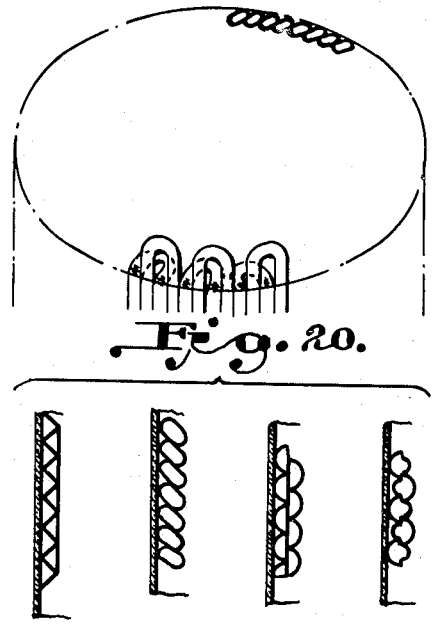
Fig. 20.

INVENTOR:
SAMUEL C. BARTLEY
BY Holcombe, Wetherill & Brubois
HIS ATTY'S.

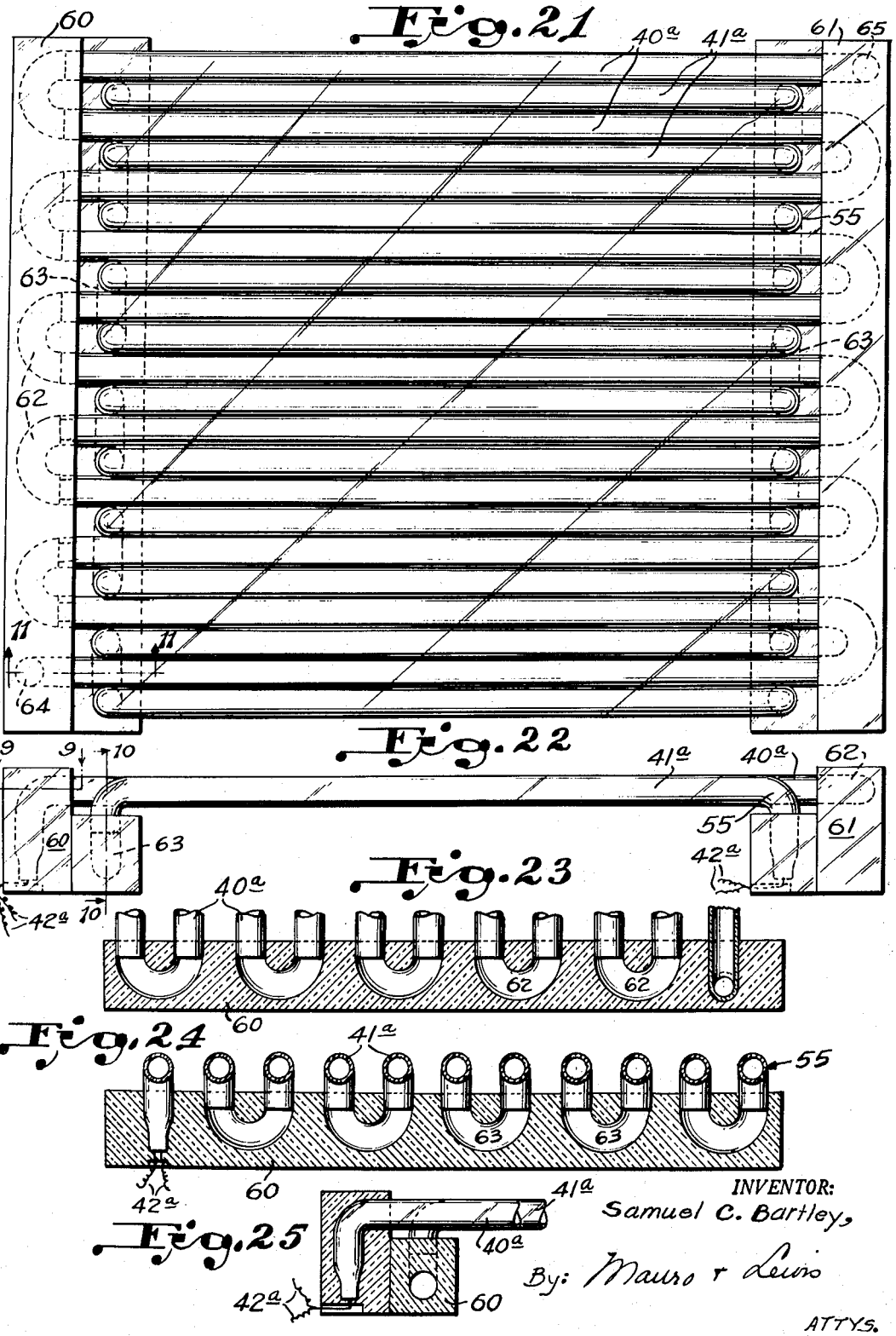

ated Apr. 24, 1956

2,743,388

ELECTRIC LAMP

Samuel C. Bartley, Washington, D. C.

Application September 8, 1953, Serial No. 379,014

3 Claims. (Cl. 313—317)

This invention relates to electric lamps and more particularly to electric discharge devices having long, sinuous discharge paths through envelopes containing gas, vapor, or a vacuum, with or without auxiliary incandescent or combustible media, and is chiefly concerned with improvements of the envelopes to provide for overlapping discharge paths.

This application is a continuation in part of copending applications Serial No. 259,659, filed December 3, 1951, Patent No. 2,726,587, entitled Illuminating Device and Photographic Contact Printer, and Serial No. 234,326, filed June 27, 1951, now abandoned, entitled Illuminating Device.

The principal object herein is the production of light evenly distributed in its origin throughout planes or curved surfaces, resulting chiefly from the overlapping discharge paths, and to cause the projection through space flatwise upon objects in contrast to the conventional practice of producing scattered rays from concentrated points or lines of origin.

Another object of this invention is to provide light distributed flatwise and bandlike in its origin for immediate actinic production in contact photography, saving the light energy usually lost in projecting it upon extensive surfaces from a distance or through a diffusing agent; to form a source of light conforming in shape and equal to or greater than the object upon which it is to be projected; and to provide a lamp requiring no reflector or optical means for diffusing or projecting its light.

Advantages to eyesight and visibility are conceivable when planes or bands of light move through space maintaining perspectively their original forms and project a softened impact upon the eyes, whereas numerous rays emanating from intense origins, such as points, lines and filaments produce piercing effects upon the eyes; and while numerous rays from point and line sources falling upon images and objects produce numerous shadows a plane or band of light projected upon them would cast a single shadow, thereby improving visibility.

Several advantages are also seen in lamp construction with the use of envelopes of cross-sectional shapes providing for overlapping light. Sufficient spacing between folds may be allowed for expansion and contraction due to temperature changes, as well as for cooling purposes. Larger envelopes can be used to accomplish the same evenness of light distribution, effecting greater efficiency and economy. In filling areas and surfaces with continuous discharge paths it was found that large envelopes provide greater areas of light with fewer electrodes and with less electrical consumption; but to provide relative evenness of distribution with large envelopes of round cross section it was found that when folds were made contiguous greater intervals and gaps in the light area would exist because of the envelope's greater cylindrical surface. Compensation for these breaks however are provided for in the overlapping envelopes described herein, and envelopes of any size may be used.

Additional advantages are provided by running the envelopes and discharge paths in pairs parallel to each other, whereby they mutually insulate themselves to prevent arcing between closely laid envelopes, allow smaller intervals between folds, and cover large areas without placing electrodes within the area.

In accomplishing the principal object of distributing light in its origin throughout a plane or curved surface, it was found most practical to conduct electricity over the plane or surface by means of continuous overlapping envelopes filled with gas, vapor, or other conductors. If it were possible to construct an unbroken chamber of the area or volume desired and fill it with the conducting and luminescent media for such a purpose the electricity, which in modern practice is made available only from small contact points, would tend to travel in straight lines from point to point, or from electrode to electrode, across the chamber and even distribution of light would not result unless innumerable, closely spaced contact points or electrodes opposite each other across the plane or surface could be provided; but such would be impracticable.

It is known to the art that dense spirals, grids, helices, convolutes, etc., of round cross section tubing serve to distribute light relatively even over planes and curved surfaces, but apparently attempts have not been made to cause more perfect distribution of light in its source with the use of envelopes of such cross-sectional shape that would permit overlapping sufficient to compensate for intervals and gaps in the light caused by the use of round tubing and to compensate for the intervals between arc streams caused by the wall thickness of such tubing.

It is also known that pairs of electric discharge paths running parallel through round tubing have been used to form various illuminating devices, but chiefly for the purpose of producing two or more colors in the light source; and apparently it has not been anticipated that pairs of discharge paths running in parallel reduce the hazards of arcing between paths provide more economical means for greater areas and volumes of light sources, and that envelopes of cross-sectional shapes providing overlapping light would produce a potentially perfect distribution of light in a plane or curved surface.

This will be more apparent in the following descriptions made in conjunction with the accompanying drawings:

Fig. 1 is a perspective detail of an electric discharge path through envelopes of any cross-sectional shape forming one unit of a rectangular grid lamp;

Fig. 2 is a perspective detail of an electric discharge path through envelopes of any cross-sectional shape forming another unit of a rectangular grid lamp;

Fig. 3 is an end and fragmentary view of the units in Figs. 1 and 2 interlocked, showing envelopes of triangular cross section;

Fig. 4 is an end and fragmentary view of the units in Figs. 1 and 2 interlocked, showing envelopes of elliptical cross section;

Fig. 5 is an end and fragmentary view of the units in Figs. 1 and 2 interlocked, showing envelopes of semicircular cross section paired in off-set and overlapping relation;

Fig. 6 is an end and fragmentary view of the units in Figs. 1 and 2 interlocked, showing envelopes of longitudinal grooving overlapping each other;

Fig. 7 is an end view of the interlocked units of Figs. 1 and 2 representing envelopes of any cross-sectional shape and showing the U-bends of one unit formed perpendicularly downward or at an angle downward from the plane of straight lengths and the U-bends of the other unit formed perpendicularly upward or at an angle upward from the plane of straight lengths;

Fig. 8 is a perspective downward view of two envelope units representative of envelopes of any cross-sectional shape forming interspaced rectangular convolute bendings interlocked;

Fig. 9 is a cross-sectional view on line 1—1 of Fig. 8, showing envelopes of triangular cross section;

Fig. 10 is a cross-sectional view of line 1—1 of Fig. 8, showing envelopes of elliptical cross section and showing the last and middle length of the convolute in envelope of triangular cross-sectional shape;

Fig. 11 is a cross-sectional view on line 1—1 of Fig. 8, showing envelope cross-sections of partitioned semi-circles in offset and overlapping relation;

Fig. 12 is a cross-sectional view of line 1—1, of Fig. 8, showing envelopes of longitudinal grooving;

Fig. 13 is a perspective downward view of two envelope units representative of any cross-sectional shape forming interspaced circular convolute bendings interlocked to form a disk of overlapping envelopes;

Fig. 14 is a perspective view of the envelope units in Figs. 1 and 2 interlocked and deflected into a curved surface to form a cyclinder of overlapping envelopes;

Fig. 15 is a top and end view of units interlocked as in Fig. 14, showing envelopes of elliptical cross section;

Fig. 16 is a cross-sectional view on line 2—2 in Fig. 14, showing envelopes of triangular cross section;

Fig. 19 is a top and end view of a pair of helical windings of envelope of any cross-sectional shape interspaced and interlocked to form a cylinder of overlapping envelopes;

Fig. 20 shows cross-sectional view of Fig. 19 along line 3—3, showing envelopes of various cross-sectional shapes;

Fig. 21 is a top plan view of a modified tube construction;

Fig. 22 is an elevation thereof;

Fig. 23 is a section taken on lines 9—9 of Fig. 22;

Fig. 24 is a section taken on lines 10—10 of Fig. 22; and

Fig. 25 is a section taken on lines 11—11 of Fig. 21.

Figure 17:
Fig. 17 is a cross-sectional view on line 2—2 in Fig. 14, showing envelope cross sections of partitioned semi-circles in offset and overlapping relation.

The figures herein are therefore presented to show means for producing with envelopes of various cross-sectional shapes a flat light in various perimetrical forms and a band light in various degrees of a curved surface. These various shapes are described herein by the term extracylindrical, the prefix extra meaning outside of or beyond being added to describe any form or shape outside of, or other than, the shape of a true cylinder, the term extra-circular being used in a similiar manner in describing the cross-sectional shapes of the envelopes. It will then be understood that in the structures of this invention any adjacent portions of the wall surfaces of collaterally adjacent envelope which are not truly cylindrical will necessarily overlap to some extent, thereby accomplishing the chief object of this invention.

Only the conventional methods of producing electric discharge devices are here chiefly dealt with; but under certain circumstances it may be necessary to aid the discharge device with filaments, and under circumstances calling for an intense light combustible media may also be necessary.

The envelopes of various cross-sectional shapes permitting the overlapping feature may be manufactured according to other methods known to the glass trade.

It will be noted that in certain arrangements of the envelopes entire units cannot be fabricated and meshed when conventional methods of bending are used, but individual lengths of segments must be first fitted within the plane or curve and then joined to adjacent lengths or segments by pre-formed bends in the nature of prefabricated fittings.

In the manufacture of the rectangular grid lamp as illustrated in Figs. 1 to 7 the conventional methods in which envelopes are bent by hand, purified by high-voltage bombardment, and pumped, may be employed in each case except in Fig. 5, in which the envelope design does not permit the meshing of the complete units. In this case straight lengths of both units may be first laid together and interlocked and then the U-bends in the form of prefabricated fittings may be attached to the ends and sealed. The interior of the envelopes may be purified by high voltage in the interlocked position one unit at a time, or together as an interlocked unit in an oven. It should be noted also that the envelope units in Fig. 4 are moved obliquely into their interlocked position.

The electrodes 1, 2, 3 and 4 represented as having round discharge rings may be used in all units, but it is more desirable to have these rings conform in shape to the walls of the envelopes used.

The rectangular convolute pairs of envelope in Fig. 8 may be meshed together as in Figs. 1 and 2 except when envelopes illustrated in Figs. 10 and 11 are used, in which cases straight lengths of the envelope may be first laid parallel and interlocked and then made continuous with prefabricated right angle fittings. In the middle interval of envelope arrangement in Fig. 10 it will be necessary to use an envelope of triangular cross section for the straight length piece 5.

The circular convolute pairs in Fig. 13 are manufactured and meshed with the same envelopes described for the rectangular convolutions, Figs. 8 to 12, and in the same manner when envelopes illustrated in Figs. 9 and 12 are used.

Figure 18:
Fig. 18 is a cross-sectional view on line 2—2 of Fig. 14, showing envelopes of longitudinal grooving.

The arrangmeent of envelopes in Figs. 14 to 20 provides for a band light—a light evenly distributed in its origin throughout a cylindrical or curved surface. In Fig. 14 the straight lengths of envelope and their U-bends resemble those in the flat formation of Figs. 1 to 7 but are deflected into a cylindrical or curved surface. The units of electric discharge paths are preferably fabricated in their interlocked position as one unit, their straight lengths meshed and overlapped individually as fabricated, but when only a curved surface or a segment of a cylinder are to be constructed the envelopes may be fabricated in the deflected units and then meshed, however only when envelopes of triangular cross section, Fig. 16, or longitudinal grooving, Fig. 18, are used. When envelopes illustrated in Figs. 15 and 17 are used it will be necessary to fabricate the units in their interlocked position as one unit, the straight lengths meshed and overlapped individually as fabricated.

The helical structure of Fig. 19 also serves to produce a band or cylindrical light, but not segments thereof. Overlapping and meshing in this instance must be done round by round of the helix. Envelopes of various cross-sectional shapes as illustrated in Fig. 20 may be used in this structure.

In Figs. 21–25 a modified form of tubing is shown. As before, two tube circuits are employed. The upper bank of tube elements 40a are formed of straight sections of tubing and the lower bank of tube elements 41a are formed of similar sections of tubing, each pair of ends of this bank terminating in a ninety degree downward bend as indicated at 55.

The turns to complete these two tube circuits are formed by providing U-shaped channels in the two connector pieces 60 and 61, which may be formed, as by molding, of any suitable material such as plastic, glass, or the like. Connectors 60 and 61 have a sectional shape best seen in Fig. 22, in the upper section of which are formed the horizontal U-shaped channels 62 in which are seated the ends of the straight tubing sections 40a, and in the notched sections of which are formed the vertical U-shaped channels 63 in which are seated the downwardly bent ends of tubing sections 41a. Tubing 40a terminates in two opposite sockets 64, 65, in connectors 60 and 61 and tubing 41a terminates in two similar sockets 65, 66, from which airtight electrical connections are made with wiring 42a.

In the arrangement just described, it will obviously be important to provide airtight seals in all joints between the tubing and the channels formed in connector pieces 60 and 61.

In the foregoing descriptions and in the figures and claims herein I have considered only electric discharge paths or circuits running in parallel pairs throughout the lamp structure. This is not intended however to exclude from this invention the obvious arrangements of a single path or circuit running from electrode to electrode, overlapping upon itself in its folds, bends and curves and solidly covering the area or surface with evenly distributed light. It may sometimes be more practical to employ a single path when small areas or surfaces are to be covered, but it is usually more practical to use pairs of paths in interspaced relation, because each path serves to electrically insulate the other, whereas a single path of a high-voltage arc lapping upon itself so closely would cause greater arcing hazards. Furthermore greater areas and surfaces can be covered by pairs running in parallel interspacing without the necessity of adding electrodes and electrical connections within the area or surface of light.

It is likewise intended that individual lengths of envelope or segments of curved envelope running from electrode to electrode, each a complete electric discharge path in itself, be also considered within the scope of this invention. However, since each electrode constitutes a voltage drop in the circuit, greater efficiency and economy are prevalent in the maximum lengths of envelope between electrodes and at the same time less metal subjected to electrical decomposition causing envelope blackening are present in the circuit.

There are many uses for the devices described above. One use is disclosed and claimed in the parent application, that is contact printing devices, but many other uses are apparent wherein illumination is desired. As pointed out above the control of shadows is easy where a light source is in a continuous plane. This is of particular advantage in television and photographic processes where it is at present necessary to have many intense lighting elements reflecting in at many angles to avoid the disturbing shadow configurations, which is especially true in television wherein the heat generated from these light sources alone constitutes a major problem.

Light projected from a plane is also of advantage in street illumination or in ordinary house lighting as it avoids eye strain due to an intense light source as is now in common use with incandescent bulbs.

The devices illustrated above are used to describe the invention, but this invention is not limited by these devices, which are used for purposes of illustration only.

What is claimed is:

1. An electric lamp with light-producing means contained in co-directional, coplanar and collaterally adjacent lengths of envelope extra-circular in cross-sectional shape, the wall surfaces thereof which are therefore extra-cylindrical being in overlapping relation to cause even distribution of light throughout the plane in which the lengths are coplanar.

2. An electric lamp with light-producing means contained in co-directional and collaterally adjacent lengths of envelope extra-circular in cross-sectional shape, the longitudinal axes of all lengths lying in a curved surface and the wall surfaces thereof which are therefore extra-cylindrical being in overlapping relation to cause even distribution of light throughout the curved surface in which the longitudinal axes are situated.

3. In an electric lamp with straight lengths of luminous envelope lying in the same plane, means for connecting the ends of said lengths making continuous the electrical path through them, said means consisting of U-channels in prisms, each U-channeled prism being equal in length to the breadth of the area occupied by the envelope ends which it connects.

References Cited in the file of this patent

UNITED STATES PATENTS

| | | |
|---|---|---|
| 1,680,633 | Peters | Aug. 14, 1928 |
| 1,984,215 | Hotchner | Dec. 11, 1934 |
| 2,117,754 | Bell | May 17, 1934 |
| 2,123,709 | Bristow et al. | July 12, 1938 |
| 2,284,046 | Doane | May 26, 1942 |
| 2,306,666 | Simmon | Dec. 29, 1942 |
| 2,406,146 | Holmes | Aug. 20, 1946 |